(12) United States Patent
Asati et al.

(10) Patent No.: US 9,419,862 B2
(45) Date of Patent: Aug. 16, 2016

(54) SYSTEM AND METHOD FOR DISCOVERING AND VERIFYING A HYBRID FIBER-COAXIAL TOPOLOGY IN A CABLE NETWORK ENVIRONMENT

(71) Applicant: CISCO TECHNOLOGY, INC., San Jose, CA (US)

(72) Inventors: Rajiv Asati, Morrisville, NC (US); Alon Bernstein, Monte Sereno, CA (US); John T. Chapman, Laguna Niguel, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/632,474

(22) Filed: Feb. 26, 2015

(65) Prior Publication Data
US 2015/0180726 A1    Jun. 25, 2015

Related U.S. Application Data

(63) Continuation of application No. 13/487,302, filed on Jun. 4, 2012, now Pat. No. 8,989,221.

(51) Int. Cl.
*H04L 12/24* (2006.01)
*H04B 10/27* (2013.01)
*H04L 12/28* (2006.01)
*H04B 3/46* (2015.01)

(52) U.S. Cl.
CPC .............. *H04L 41/12* (2013.01); *H04B 10/27* (2013.01); *H04L 12/2801* (2013.01); *H04L 41/0853* (2013.01); *H04B 3/46* (2013.01)

(58) Field of Classification Search
CPC ............. H04B 10/2575; H04N 17/004; H04L 12/6418; H04L 45/02
See application file for complete search history.

(56) References Cited

U.S. PATENT DOCUMENTS

| 5,966,519 | A | 10/1999 | Keeley |
| 6,574,797 | B1 * | 6/2003 | Naegeli et al. ................. 725/120 |
| 6,839,829 | B1 * | 1/2005 | Daruwalla .......... H04L 12/2801 348/E7.07 |

(Continued)

OTHER PUBLICATIONS

Cable-Television Laboratories, Inc., "Data Over Cable Service Interface Specifications DOCSIS Modular CMTS, Downstream External PHY Interface specification CM-SP-DEPI-I05-070223," Feb. 23, 2007; 80 pages.

(Continued)

*Primary Examiner* — Shaq Taha
(74) *Attorney, Agent, or Firm* — Patent Capital Group

(57) ABSTRACT

A method in an example embodiment can include polling a first cable modem in a cable network and receiving a first response message from the first cable modem identifying a downstream frequency detected by the first cable modem. The method further includes determining the downstream frequency is split between at least two fiber nodes and determining a cable modem termination system (CMTS) service group topology, where the topology includes the at least two fiber nodes. In specific embodiments, determining that the downstream frequency is split is based on at least the first response message from the first cable modem and a second response message from a second cable modem. In more specific embodiments, the method includes constructing a hybrid fiber-coaxial (HFC) topology map of the cable network based on at least the first and second response messages, where the HFC topology map indicates the CMTS service group topology.

15 Claims, 7 Drawing Sheets

(56) References Cited

U.S. PATENT DOCUMENTS

| | | | |
|---|---|---|---|
| 7,054,926 B1 | 5/2006 | Abidi et al. | |
| 7,058,007 B1 * | 6/2006 | Daruwalla | H04L 45/28 370/216 |
| 7,065,779 B1 | 6/2006 | Crocker et al. | |
| 7,155,511 B1 | 12/2006 | Nguyen | |
| 7,209,442 B1 | 4/2007 | Chapman | |
| 7,242,694 B2 | 7/2007 | Beser | |
| 7,450,579 B2 | 11/2008 | Howard et al. | |
| 7,966,409 B1 * | 6/2011 | Daruwalla | H04L 12/2801 709/228 |
| 8,081,659 B2 | 12/2011 | Sowinski et al. | |
| 8,989,221 B2 | 3/2015 | Asati et al. | |
| 2002/0100056 A1 | 7/2002 | Bortolini et al. | |
| 2002/0105965 A1 | 8/2002 | Dravida et al. | |
| 2003/0142690 A1 * | 7/2003 | Beser | 370/432 |
| 2003/0163831 A1 * | 8/2003 | Gall et al. | 725/127 |
| 2003/0177502 A1 | 9/2003 | Kolze et al. | |
| 2004/0244044 A1 | 12/2004 | Brommer | |
| 2006/0126660 A1 | 6/2006 | Denney et al. | |
| 2006/0251097 A1 | 11/2006 | Chapman et al. | |
| 2006/0262722 A1 | 11/2006 | Chapman et al. | |
| 2007/0086484 A1 | 4/2007 | Quigley et al. | |
| 2007/0195817 A1 | 8/2007 | Denney et al. | |
| 2007/0195824 A9 | 8/2007 | Chapman et al. | |
| 2007/0280291 A1 | 12/2007 | Beser | |
| 2008/0056292 A1 | 3/2008 | Hong et al. | |
| 2008/0123691 A1 | 5/2008 | Beser | |
| 2008/0273548 A1 | 11/2008 | Leano et al. | |
| 2009/0232111 A1 | 9/2009 | Li et al. | |
| 2010/0039964 A1 * | 2/2010 | Roy | 370/260 |
| 2010/0128740 A1 | 5/2010 | Beser | |
| 2010/0142553 A1 | 6/2010 | Kolze | |
| 2010/0246421 A1 | 9/2010 | Marshall | |
| 2012/0213259 A1 * | 8/2012 | Renken | H04N 7/17309 375/222 |

OTHER PUBLICATIONS

Cable Television Laboratories, Inc., "Data-Over-Cable Service Interface Specifications DOCSIS 3.0—Physical Layer Specification," Nov. 17, 2011, 171 pages; http://www.cablelabs.com/specifications/CM-SP-PHYv3_0_110-111117.pdf.

Cisco Systems, Inc., "Cable Fiber Node Best Practices for the uBR10k—Document ID 82070," Feb. 28, 2007; 4 pages http://www.cisco.com/en/US/tech/tk86/tk804/technologies_tech_note09186a00807f32fd.shtml.

Pularikkal, Byju, Cisco Systems, Inc., "Introduction to DOCSIS 3.0," presented Jun. 14, 2009 at NANOG46 of North American Network Operator's Group; 100 pages http://www.nanog.org/meetings/nanog46/presentations/Sunday/Byju_Intro_DOCSIS_N46.pdf.

Cable Television Laboratories, Inc., "Data-Over-Cable Service Interface Specifications DOCSIS 3.0—MAC and Upper Layer Protocols Interface Specification," Nov. 17, 2011 http://www.cablelabs.com/specifications/CM-SP-MULPIv3.0-I17-111117.pdf.

USPTO Aug. 4, 2011 Non-Final Office Action from U.S. Appl. No. 11/744,148.

USPTO Jan. 4, 2012 Response to Aug. 4, 2011 Non-Final Office Action from U.S. Appl. No. 11/744,148.

USPTO Feb. 21, 2012 Final Office Action from U.S. Appl. No. 11/744,148.

USPTO Apr. 19, 2013 Non-Final Office Action from U.S. Appl. No. 11/744,148.

USPTO Jan. 15, 2014 Final Office Action from U.S. Appl. No. 11/744,148.

USPTO Oct. 1, 2014 Non-Final Office Action from U.S. Appl. No. 11/744,148.

USPTO Mar. 23, 2015 Non-Final Office Action from U.S. Appl. No. 11/744,148.

* cited by examiner

| CMTS SERVICE GROUP | PORT | FIBER NODE | RF CHANNELS |
|---|---|---|---|
| CMTS-DS-SG 1 | 1 | FN1 | D1/D2/D3 |
| CMTS-DS-SG 2 | 2/3/4 | FN2/FN3 | D4/D5/D6/D7/D8 |
| CMTS-US-SG 1 | 5 | FN1 | U1 |
| CMTS-US-SG 2 | 6 | FN2/FN3 | U2 |
| CMTS-SG 1 | 1/5 | FN1 | D1/D2/D3/U1 |
| CMTS-SG 2 | 2/3/4/6 | FN2/FN3 | D4/D5/D6/D7/D8/U2 |

SYSTEM AND METHOD FOR DISCOVERING AND VERIFYING A HYBRID FIBER-COAXIAL TOPOLOGY IN A CABLE NETWORK ENVIRONMENT

RELATED APPLICATION

This Application is a continuation (and claims the benefit of priority under 35 U.S.C. §120) of U.S. Application Ser. No. 14/487,302, filed Jun. 4, 2012, entitled "SYSTEM AND METHOD FOR DISCOVERING AND VERIFYING A HYBRID FIBER-COAXIAL TOPOLOGY IN A CABLE NETWORK ENVIRONMENT," Inventors Rajiv Asati, et al. The disclosure of the prior application is considered part of (and is incorporated in its entirety by reference in) the disclosure of this application.

TECHNICAL FIELD

This disclosure relates in general to the field of cable technologies in a cable network environment and, more particularly, to a system and a method for discovering a hybrid fiber-coaxial topology in a cable network environment

BACKGROUND

The Data-Over-Cable Service Interface Specification (DOCSIS®), created by CableLabs research consortium, is an international telecommunications standard that defines interface requirements for cable modems and supporting equipment related to high-speed data transfer and distribution over cable networks. In particular, DOCSIS defines a protocol for bi-directional signal exchange between a cable modem termination system (CMTS) operated by cable service providers and cable modems (at multiple customer premises) over a hybrid fiber-coaxial (HFC) cable plant. Downstream channels from the CMTS can service multiple cable modems through a continuous signal in the downstream direction, while TDMA burst signals in the upstream direction can be received by the CMTS from the cable modems.

A CMTS forms part of a cable company's headend of a cable network and can be connected to the Internet using very high capacity data links to a network service provider (e.g., using Ethernet interfaces). DOCSIS is widely used by cable service providers to offer Internet access through existing hybrid fiber-coaxial (HFC) infrastructures.

A DOCSIS 3.0 implementation entails the CMTS being aware of the HFC topology in the form of the fiber-node configuration that associates a set of downstream and upstream QAM channels (modular or integrated). Many features and functionalities (e.g., Mac Domain Descriptor/upstream ambiguity resolution, load-balancing, spectrum management, etc.) involve HFC topology awareness. In particular, HFC topology information can include fiber node identification, which subscribers each fiber node services, and service group configurations including downstream and upstream channels, and associated ports. When the HFC topology is new or changes, there is a need to ensure that accurate HFC topology information is provided to the CMTS.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in an example embodiment includes polling a first cable modem in a cable network and receiving a first response message from the first cable modem identifying a downstream frequency detected by the first cable modem. The method further includes determining the downstream frequency is split between at least two fiber nodes and determining a cable modem termination system (CMTS) service group topology, which is determined to include the at least two fiber nodes. In specific embodiments, determining that the downstream frequency is split is based on at least the first response message from the first cable modem and a second response message from a second cable modem. In more specific embodiments, the method includes constructing a hybrid fiber-coaxial (HFC) topology map of the cable network based on at least the first and second response messages, where the HFC topology map indicates the CMTS service group topology. In more specific embodiments, the method includes comparing the constructed HFC topology map to a preconfigured HFC topology map provided by the CMTS and reporting an error if the constructed HFC topology map does not match the preconfigured HFC topology map.

Example Embodiments

Figure 1:
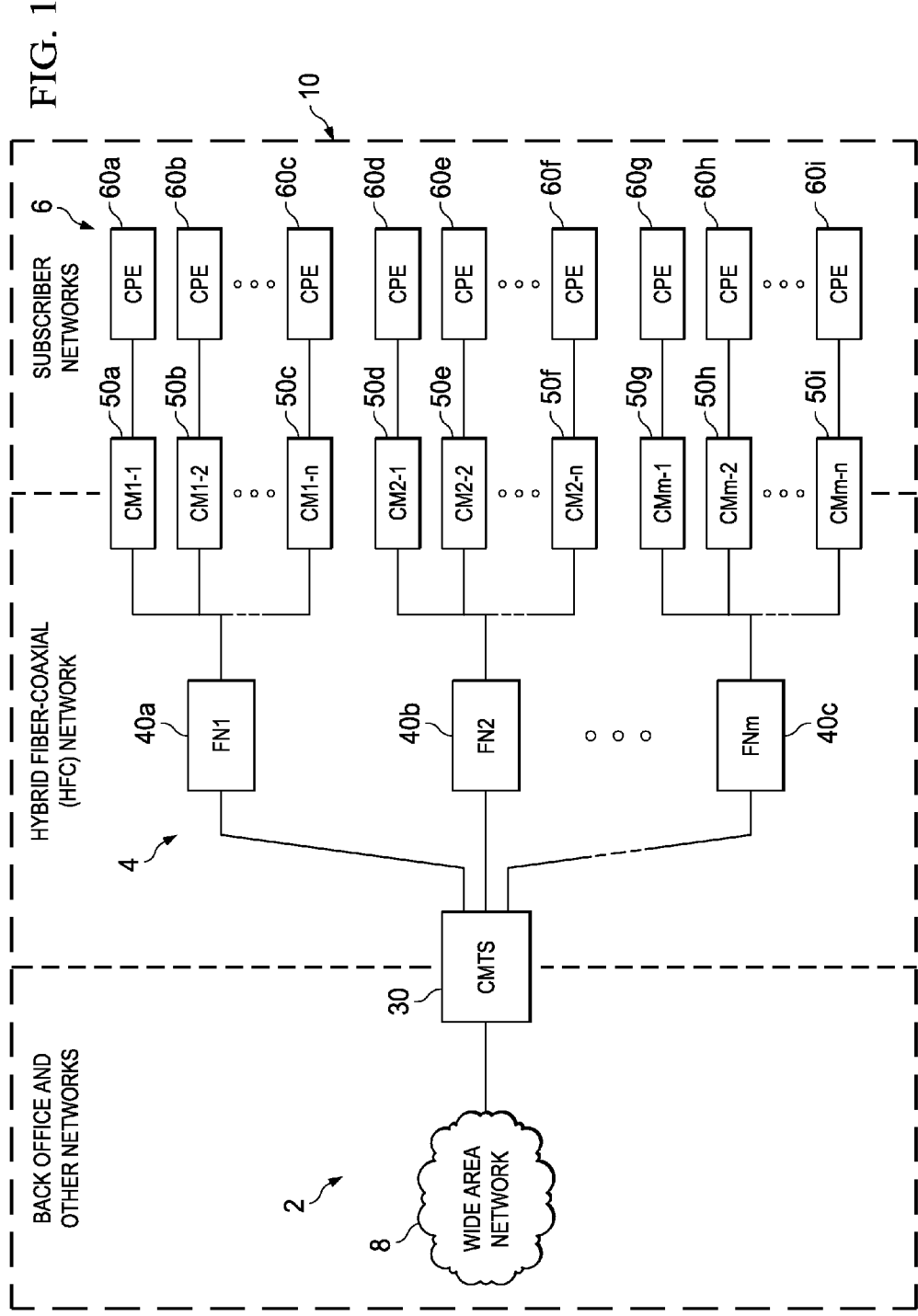
FIG. 1 is a simplified block diagram of one embodiment of a cable network in accordance with the present disclosure.

FIG. 1 is a simplified block diagram of a cable network 10 for transmitting data over optical fiber and cable between a cable company's headend and network endpoints. In example cable network 10, a cable modem termination system (CMTS) 30, which may form part of the cable company's headend, is configured to communicate with a wide area network 8 (e.g., the Internet) and fiber nodes 40a, 40b, and 40c (FN1-FNm), which are part of a hybrid fiber-coaxial (HFC) network 4. Fiber nodes 40a, 40b, and 40c are configured to communicate with one or more subscriber cable modems (CMs) such as cable modems 50a-c (CM1-1 through CM1-n), cable modems 50d-f (CM2-1 through CM2-n), and cable modems 50g-i (CMm-1 through CMm-n), respectively. Each cable modem connects HFC network 4 to one or more network endpoints, collectively referred to as customer premises equipment (CPE) and represented as single boxes 60a-i for ease of illustration. Each cable modem 50a-i and its corresponding customer premises equipment 60a-i can form a distinct subscriber network (e.g., a home network) of subscriber networks 6. CMTS 30 can be configured to provide high speed data services such as internet services and voice-over-IP (VOIP) services. In one example embodiment, cable network 10 employs Data-Over-Cable Service Interface Specification (DOCSIS) standards for the high speed data services provided by CMTS 30. For ease of reference, fiber nodes 40a-c, cable modems 50a-i, and CPEs 60a-i may be referred to herein singularly as fiber node 40, cable modem 50, and CPE 60, or collectively as fiber nodes 40, cable modems 50, and CPEs 60, respectively.

Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Cable network 10 may include a configuration capable of transmission control protocol/Internet protocol (TCP/IP) communications for the electronic transmission or reception of packets in a network. Cable network 10 may also operate in conjunction with a user datagram protocol/IP (UDP/IP) or any other suitable protocol, where appropriate and based on particular needs.

Networks 2, 4, and 6 in FIG. 1 represent a series of points or nodes of interconnected communication paths for receiving and transmitting packets of information that propagate through cable network 10. Additionally, networks 2, 4, and 6 offer communicative interfaces between network elements. Back office and other networks 2 can include any local area network (LAN), wireless local area network (WLAN), metropolitan area network (MAN), Intranet, Extranet, wide area network (e.g., WAN 8), virtual private network (VPN), or any other appropriate architecture or system that facilitates communications in a network environment. Subscriber networks 6 can include any local area network (LAN), wireless local area network (WLAN), virtual private network (VPN), or any other appropriate architecture or system that facilitates communications with customer premises equipment 60a-i in a cable network environment. Hybrid fiber-coaxial (HFC) network 4 can include a bi-directional hybrid network with both optical fibers and coaxial cables and intermediate devices (e.g., fiber nodes 40a-c) for receiving, translating, and forwarding signals between them. Other appropriate network elements not shown in HFC network 4 can include, for example, splitters and amplifiers.

Certain terminologies are used herein with regard to the various embodiments of the present disclosure. As used herein, "bi-directional" references to signals, operations, communication flows, networks, systems etc. means that communication signals (or traffic) are carried in both directions on the same cable network, for example, from a CMTS to a cable modem and from the cable modem to the CMTS. As used herein, "downstream" references to signals, traffic, communications, messages, etc. are intended to encompass communication traffic carrying information from a CMTS to a cable modem (e.g., video content, voice data, Internet data, etc.). Conversely, "upstream" references to signals, traffic, communications, messages, etc. are intended to encompass communication traffic carrying information from a cable modem to a CMTS (e.g., Internet data, email, requests to order video content, etc.). The term "link" as used herein, encompasses a physical or logical communications channel (e.g., a physical transmission medium such as a wire or cable, or a logical transmission medium such as a radio channel) that connects two or more communicating devices. As used herein, the terms "downstream channel" and "upstream channel" can be defined by a set of attributes or properties related to downstream traffic and upstream traffic, respectively, in a cable network. The terms "downstream frequency" and "upstream frequency" as used herein can be attributes of downstream and upstream channels, respectively, and are intended to encompass radio frequencies over which downstream and upstream traffic is carried, respectively, in a cable network. The term "data" as used herein refers to any type of numeric, voice, video, or script data, or any type of source or object code, or any other suitable information in any appropriate format (e.g., packets, frames, cells, etc.) that may be communicated from one point to another in electronic devices and/or networks.

For purposes of illustrating the operational aspects of cable network 10, it is important to understand the communications that may be traversing the network and the problems that may be present in operational scenarios transpiring in a cable network such as the one shown in FIG. 1. The following foundational information may be viewed as a basis from which the present disclosure may be properly explained. Such information is offered for purposes of explanation only and, accordingly, should not be construed in any way to limit the broad scope of the present disclosure and its potential applications.

A typical cable operator can have numerous headends, which are master facilities that receive communication traffic or signals (e.g., television, Internet, email, etc.) for processing and distribution over a cable network to network endpoints (e.g., customer premises equipment (CPE)) in subscriber networks (i.e., a home, office, etc. having a cable modem and one or more CPEs). Headends also receive and process various types of communication signals from the network endpoints. A single physical coax cable can service a large number of network endpoints (e.g., in 500 homes) in a cable network by amplifying and splitting (or 'tapping') the signal along the cable.

In modern cable networks, a hybrid fiber-coaxial (HFC) network provides communication paths between a cable modem termination system (CMTS) in the cable headend and cable modems in subscriber networks. The headend may convert received signals to coax signals, convert the coax signals to optical signals, and send the optical signals downstream over optical fiber to one or more fiber nodes in the HFC network. The fiber nodes can include broadband optical receivers that convert the downstream optical signals back to electrical signals. The fiber nodes can then split the electrical signals through individual coaxes. Each physical coax cable can provide many channels (e.g., 158 channels) and each fiber node may feed one or more coax cables. Optical fiber offers signal transmission at higher bandwidths and, therefore, optical fiber is typically provided over a majority of the distance between the CMTS and the subscriber networks, whereas the coax cables are generally provided along a shorter distance proximate the subscriber networks. Thus, the fiber nodes are typically physically located relatively near (e.g., a mile) to the subscriber networks they feed.

In a cable network, different frequencies are used for carrying different content in downstream signals from the headend. Some equipment used for generating signals, such as a signal for a major television (TV) network (e.g., ABC, NBC, etc), can have a tremendous cost. Thus, it is often desirable to split these downstream signals at the headend and then transmit the split signals over the same frequency to multiple fiber nodes, thereby increasing the number of subscriber networks that receive the signal from a single source. Bandwidth demands, however, can limit how much certain signals can be split in order to maintain an acceptable quality level. Consequently, certain downstream signals may be split and transmitted to a certain number of fiber nodes over one frequency, while other downstream signals may be split and transmitted to a different number of fiber nodes over a different frequency. Furthermore, each signal that is split is associated with a single port at the headend, but multiple ports can potentially provide the same signal, each of which may be split and transmitted to different fiber nodes.

A 'topology' of an HFC network refers to a fiber node configuration that associates a set of downstream and/or upstream QAM channels (modular or integrated) in the HFC network. Splitting downstream signals at the headend and then sending various combinations of downstream signals (split and/or undivided) of different frequencies to multiple fiber nodes, which in turn split the signals over coax cables to feed potentially hundreds of thousands of subscriber networks, can produce a complicated topology. A topology of a given HFC network can be divided into one or more service groups. A service group can include a particular group of subscribers connected to the same shared media. In one example scenario, a coax cable could be a shared media and all of the subscribers connected to the coax cable could form a service group.

Service groups can be defined based on a particular view of a network element within a cable network, and signal splitting (also referred to herein as 'frequency splitting') can result in service groups that span multiple coax cables and fiber nodes. From a CMTS view, a CMTS service group (CMTS-SG) can be defined by a collection of fiber nodes that share at least one downstream (DS) frequency or at least one upstream (US) frequency. A downstream frequency is shared when a downstream frequency from a single port is split and sent to different fiber nodes from the single port. An upstream frequency is shared when the same upstream frequencies are sent to the same port on the CMTS from different fiber nodes. In many implementations, however, upstream frequencies are not shared. As a result, the cable modems in subscriber networks that receive downstream signals from fiber nodes are typically associated with a service group defined by a collection of fiber nodes that share at least one downstream frequency, but do not have any shared upstream frequencies. Moreover, each fiber node in the collection of fiber nodes, shares a frequency with at least one other fiber node in the collection, but not necessarily all fiber nodes in the collection. For example, if fiber node 1 (FN1) shares a downstream frequency with fiber node 2 (FN2), and FN2 shares a downstream frequency with fiber node 3 (FN3), then FN1, FN2, and FN3 form a CMTS service group (assuming no upstream frequencies are shared with fiber nodes other than FN1, FN2, and FN3). However, if FN2 and FN3 do not share a downstream frequency, then FN1 and FN2 could form one CMTS service group and FN3 could form another CMTS service group.

In Data-Over-Cable Service SpecifFications 3.0 (DOCSIS 3.0), a cable modem service group (CM-SG) is defined as the complete set of downstream and upstream channels within a single CMTS that a single cable modem could potentially receive or transmit on. In most HFC deployments, a CM-SG corresponds to a single fiber node, and a CM-SG typically serves multiple cable modems in subscriber networks.

A MAC domain is defined in DOCSIS 3.0 as a subcomponent of the CMTS that provides data forwarding services to a set of downstream and upstream channels in the HFC network. A MAC Domain Cable Modem service group (MD-CM-SG) is defined as the set of downstream and upstream channels of a single MAC domain. Typically, an operator configures each upstream and downstream channel of a CMTS into a MAC domain. A MD-CM-SG may differ from a CM-SG if multiple MAC domains are assigned to the same CM-SGs.

For each of the defined complete service groups (CMTS-SG, CM-SG, and MD-CM-SG), a corresponding downstream and upstream service group can be defined. A downstream service group is generally a subset of the corresponding complete service group (CMTS-SG, CM-SG, or MD-CM-SG), but is confined to the downstream channels of the corresponding complete service group. An upstream service group is generally a subset of the corresponding complete service group (CMTS-SG, CM-SG, or MD-CM-SG), but is confined to the upstream channels of the corresponding complete service group.

An implementation of Data-Over-Cable Service Interface Specifications 3.0 (DOCSIS 3.0) in a cable network entails the CMTS (or an edge quadrature amplitude modulation (EQAM)) to be aware of the HFC topology (also referred to herein as 'plant topology'), including service groups. If the HFC topology changes (e.g., fiber node splitting occurs, physical connectivity changes, etc.) and the CMTS (or EQAM) is not notified of the changes (e.g., by modifying the HFC topology configuration in the CMTS), then service outages can occur.

When the plant topology has been configured at the CMTS, DOCSIS 3.0 provides a process known as 'topology resolution', which can be used after physical connectivity (layer 1) is established, to determine which fiber node is connected to the cable modem and which service group is associated with the cable modem. In this process, the configured plant topology provided by the CMTS may be used to determine a service group to which a cable modem belongs. During topology resolution, a MAC domain descriptor (MDD) may be broadcast to cable modems. An MDD message can contain a summarized plant topology that indicates which downstream and upstream channels are available. A cable modem tunes to frequencies in the MDD message and notes the channel identifiers (channel IDs) associated with those frequencies. When the cable modem has discovered a list of frequencies and channel identifiers that match the frequencies and channel identifiers in one of the service groups in the MDD message, then the cable modem selects that service group and provides this information to the CMTS. In one example scenario, if the selected service group includes multiple fiber nodes, then the CMTS can determine which fiber node is connected to the cable modem by identifying the port on which the upstream message from the cable modem is received.

The process of topology resolution requires the CMTS to have knowledge of the plant topology prior to sending the MDD message. The HFC topology of a cable network is typically manually configured and maintained in the CMTS by the cable company (also referred to herein as 'Multiple System Operator' or 'MSO'). A technician may configure the CMTS with relevant details of the topology such as, subscriber addresses, service groups associated with subscribers, identification of which fiber nodes are connected to which downstream and upstream ports of the CMTS, etc. When changes are made in the HFC topology (e.g., additional fiber node splitting occurs, etc.) the changes are generally manually updated at the CMTS.

Some cable MSOs service tens of millions of subscribers and, consequently, manual configuration and maintenance can be a significant operational burden. Potential problems include changes that are not properly recorded and updated in the CMTS such as fiber node splitting for load-balancing, changing physical connectivity, etc. Another potential problem is the inability to detect malicious theft of service (e.g., someone tapping a coax cable and dropping a cable to their cable modem). Additionally, manual configuration and maintenance are prone to human error, which can increase the likelihood of a service level agreement (SLA) being impacted. Moreover, the cable MSO's profitability and reputation may be adversely affected by service problems caused from errors in the topology configuration or changes to the topology that are not properly updated at the CMTS. Consequently, there is a need to ensure that accurate HFC topology information is quickly and easily available to the CMTS when the HFC topology is new or changes.

Figure 2:
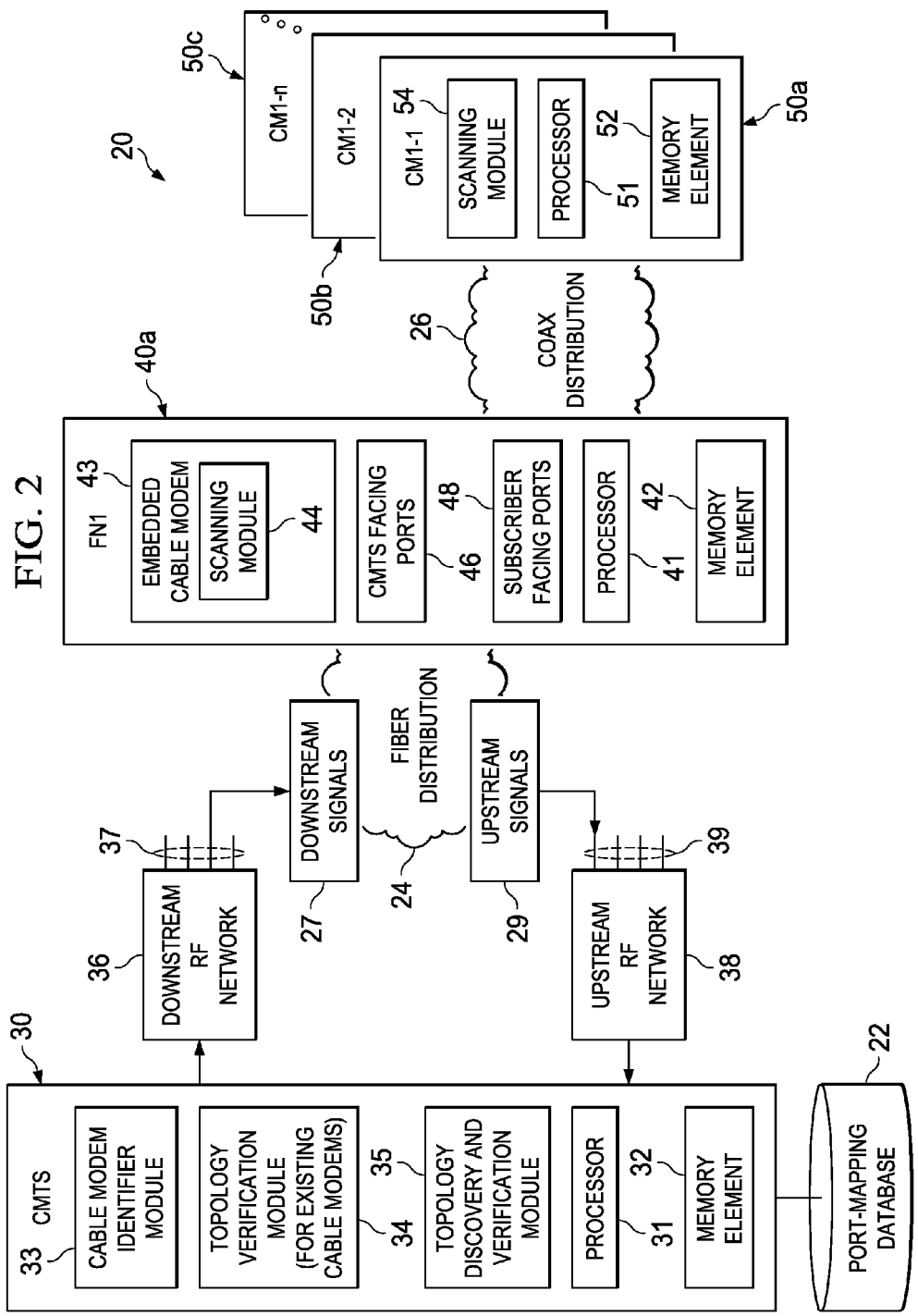
FIG. 2 is a simplified block diagram showing additional details of representative components in the cable network of FIG. 1 in accordance with various embodiments of the present disclosure.

A system 20 for discovering and verifying a hybrid fiber-coaxial topology, as shown in FIG. 2, can resolve many of these issues. FIG. 2 illustrates several in-band, dynamic embodiments for discovering and/or verifying HFC topology and determining service groups. More particularly, FIG. 2 illustrates one embodiment in which the HFC topology can be verified using existing subscriber cable modems that employ a specification standard permitting the cable modems to respond to commands to change frequencies (e.g., DOCSIS 3.0). In one embodiment represented by FIG. 2, commands can be sent to cable modems that are registered and operating in order to test every frequency in the MAC domain cable modem service group associated with the individual cable modems, which can be determined from an existing HFC topology map (e.g., preconfigured manually) in the CMTS. Any suitable set of cable modems (e.g., all cable modems serviced by the CMTS, cable modems of one or more selected service groups, a selected subset of cable modems in a service group, etc.) can be selected in order to verify the corresponding HFC topology. If all cable modems in a selected set of cable modems can successfully move to the frequencies in the associated MAC domain cable modem service group, then the corresponding HFC topology can be verified. However, if any cable modem is unable to move to one or more frequencies that are associated with the cable modem, then a possible error in the topology can be reported and appropriate action can be taken, if necessary.

FIG. 2 also illustrates other embodiments in which the HFC topology of a cable network can be discovered and/or verified through cable modems 50 in subscriber networks 6 or through embedded cable modem(s) 43 in fiber nodes 40. The embodiments of system 20 in which discovery and verification occurs through communications with embedded cable modems 43 of fiber nodes 40 is referred to herein as a 'fiber node implementation.' The embodiments of system 20 in which discovery and verification occurs through communications with subscriber cable modems 50 is referred to herein as a 'subscriber cable modem implementation.' These embodiments can offer a discovery mode and/or a verification mode. In both modes, a subscriber cable modem or an embedded cable modem on a fiber node can scan for frequencies to determine which frequencies it can detect, and sends this information to CMTS 30. An HFC topology map can be constructed (e.g., in the CMTS) using the information received from the cable modems. In the discovery mode, the constructed HFC topology map obviates the need for manual HFC topology configuration and enables the cable modems to come on-line by registering to CMTS 30 in DOCSIS 3.0. In the verification mode, a determination can be made as to whether the constructed HFC topology map matches an existing topology map of the CMTS (e.g., preconfigured manually or automatically discovered). If the constructed topology map does not match the existing CMTS HFC topology configuration, then a possible error can be reported and appropriate action can be taken, if necessary.

Turning to the infrastructure of FIG. 2, FIG. 2 is a simplified block diagram illustrating an example system 20 for discovering and/or verifying an HFC topology, shown in a representative segment of cable network 10. In system 20, CMTS 30 may contain a cable modem identifier module 33, a topology verification module for existing cable modems 34, and a topology discovery and verification module 35. A port mapping database 22 may be provided in CMTS 30, external to CMTS 30 in the headend, or potentially in a remote network (e.g., a cloud) that is accessible by CMTS 30. Downstream and upstream radio frequency (RF) networks 36 and 38, respectively, may be provided in the headend for sending downstream signals 27 via downstream ports 37 and for receiving upstream signals 29 via upstream ports 39 across optical fibers in fiber distribution 24 of HFC network 4. Fiber node 40a (FN1) communicates with downstream and upstream RF networks 36 and 38, respectively, through fiber distribution 24. In a fiber node implementation of system 20, fiber node 40a includes embedded cable modem 43 that contains a scanning module 44. Additionally, fiber node 40a includes CMTS facing ports 46 for sending upstream signals 29 to and receiving downstream signals 27 from CMTS 30. Fiber node 40a also includes subscriber facing ports 48 for sending and receiving electrical signals to cable modems 50a-50c across coax distribution 26. In a subscriber cable modem implementation of system 20, cable modems 50a-50c each include a scanning module 54, which may function in a similar manner to scanning module 44 in embedded cable modem 43.

In one embodiment, DOCSIS standard protocols (e.g., DOCSIS 3.0) may be implemented in cable network 10. CMTS 30 can be a DOCSIS network element that forwards packets between network side interface ports (not shown) facing wide area network 8, for example, and DOCSIS RF interface ports 37 and 39. In addition, CMTS 30 can be integrated or modular. FIG. 2 illustrates an integrated CMTS that can directly implement RF interface ports 37 and 39 in a single network element. In a CMTS modular implementation, upstream RF interfaces can be implemented on a modular CMTS core network and downstream RF interfaces can be implemented on an edge QAM (EQAM) element. References to 'CMTS' herein are intended to refer to either an integrated or modular CMTS configuration, unless specifically referenced otherwise.

Fiber distribution 24, fiber node (FN1) 40a, and coax distribution 26, as shown in FIG. 2, form part of HFC network 4. HFC network 4 can be a broadband bi-directional shared-media transmission system with fiber distribution 24 (e.g., fiber trunks) providing communication between CMTS 30 and fiber node 40a, and with coax distribution 26 (e.g., coaxial cables) providing communication between fiber node 40a and cable modems 50a-50c on subscriber networks 6. A physical layer (PHY) is provided by HFC network 4 and relates to layer 1 in the Open Systems Interconnection (OSI) architecture. This layer provides services to transmit bits or groups of bits over a transmission on a link between open systems and may entail electrical, mechanical, and handshaking procedures.

Fiber nodes in HFC network 4, such as fiber node 40a, are network elements that can receive optical downstream signals 27 over fiber distribution 24, convert optical signals 27 to electrical signals and send the electrical signals over coax distribution 26 to cable modems, such as cable modems 50a-c, in subscriber networks 6. The fiber nodes can receive electrical signals over coax distribution 26, convert the electrical signals to optical signals, and send the optical signals to CMTS 30 over fiber distribution 24. These optical upstream signals 29 can be received on upstream ports 39. Generally, fiber nodes can be dumb devices (i.e., devices with limited functionality) that may not even be capable of independently communicating with CMTS 30 (or an EQAM). Although some fiber nodes may have an out-of-band rudimentary maintenance channel, this typically offers limited communication capabilities, such as communicating with other fiber nodes.

Cable modems 50a-c may connect HFC network 4 and subscriber networks 6 (e.g., home networks) by bridging packets between them. Customer premises equipment (such as CPEs 60 shown in FIG. 1) can be embedded with corresponding cable modems 50 in a single device, or the cable modems can be separate standalone devices. One or more CPEs 60 may be connected to a cable modem in a subscriber network. CPEs may use, for example Internet Protocol version 4 (IPv4), Internet Protocol version 6 (IPv6), both forms of IP addressing, or any other suitable addressing protocol. Example CPE devices can include network elements and network endpoints such as, for example, home routers, set-top devices, personal computers, laptops, smart phones, tablets, gaming systems, smart appliances, etc.

In one example implementation of system 20, CMTS 30, fiber node 40a, and cable modems 50a-c are network elements, which facilitate bi-directional communication flows in a cable network (e.g., for networks such as those illustrated in FIGS. 1-2). As used herein, the term 'network element' is meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a cable network environment. This may be inclusive of appropriate algorithms and communication protocols that allow for the effective exchange of data or information.

In various implementations, CMTS 30, fiber node 40a, and/or cable modems 50a-c include software to achieve (or to foster) the discovery and verification operations, as outlined herein. Note that in one example, each of these elements can have an internal structure (e.g., a processor, a memory element, etc.) to facilitate some of the operations described herein. In other embodiments, these discovery and verification determinations may be executed externally to these elements, or included in some other network element to achieve this intended functionality. Alternatively, CMTS 30, fiber node 40a, and/or cable modems 50a-c may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof. Descriptions herein regarding the infrastructure and operation of specific components in FIG. 2, such as fiber node 40a and cable modems 50a-50c, are for ease of illustration and can be equally applicable to the other fiber nodes 40 and cable modems 50 referenced in FIG. 1.

In operational terms, and in one example embodiment, topology verification module 34 can communicate with registered (e.g., in accordance with DOCSIS 3.0), on-line cable modems (e.g., cable modems 50a-c) to verify the manual configuration of an HFC topology in CMTS 30. In this embodiment, a feature of DOCSIS 3.0, referred to as 'dynamic channel change', can be used after cable modems are registered to verify that the HFC topology associated with the cable modems is properly configured in CMTS 30. Topology verification module 34 can verify each cable modem 50a-i is properly connected to upstream and downstream frequencies as configured in the CMTS (e.g., in an existing HFC topology map). An HFC topology map could be stored in any suitable storage structure (e.g., a table, database, spreadsheet, etc.) and provides information related to the HFC topology of HFC network 4, such as service groups associated with subscriber cable modems 50 and fiber nodes 40 (e.g., CMTS service groups, MAC domain service groups, cable modem service groups), identification of which upstream frequencies from which fiber nodes are sent to which upstream ports of the CMTS, identification of which downstream frequencies from which downstream ports of the CMTS are received by which fiber nodes, and any other information or any suitable combination of such information providing relevant details of the topology. In one example embodiment, the HFC topology map could be configured in port-mapping database 22.

To verify the HFC topology, topology verification module 34 can identify frequencies that should be available to a particular cable modem, according to the HFC topology map at CMTS 30, and can send appropriate commands to cause the cable modem to attempt to move to each of the identified frequencies. Once the cable modem has moved (or attempted to move) to an identified frequency, a response message can be sent to CMTS 30 to indicate whether the move was successful. If the cable modem successfully moved to each identified frequency, then the HFC topology is verified for that particular cable modem. If the cable modem is unable to move to any one of the identified frequencies, however, then the HFC topology is not verified. Any appropriate action may be taken if the topology is not verified such as reporting the error to a cable operator, taking a cable modem off-line, etc. Additionally, topology verification module 34 can be configured to allow cable operators to select any suitable set of components for verification (e.g., a set of one or more fiber nodes, a set of one or more particular cable modems in subscriber networks, all fiber nodes and corresponding cable modems in a CMTS, a set of one or more service groups, etc.)

In another embodiment of system 20, topology discovery and verification module 35 can be configured in CMTS 30 with a discovery mode to dynamically discover fiber nodes 40 and build the HFC topology (or a portion of the HFC topology) automatically, without requiring manual configuration at CMTS 30. Additionally, topology discovery and verification module 35 can also be configured with a verification mode to provide verification of a previously discovered (or manually configured) HFC topology. This embodiment can be achieved in a fiber node implementation in which a scanning module is provided in embedded cable modems of fiber nodes (e.g., scanning module 44 in embedded cable modem 43 of fiber node 40a). Alternatively, this embodiment can be achieved in a subscriber cable modem implementation in which a scanning module is provided in subscriber cable modems (e.g., scanning module 54 in subscriber cable modems 50a-c). For existing fiber nodes 40 and cable modems 50 in cable network 10, scanning modules 44 or 54 can be deployed in software upgrades to the respective fiber nodes 40 or cable modems 50. Thus, a fiber node implementation could offer less overhead and maintenance as the number of fiber nodes 40 to upgrade in a fiber node implementation is likely to be less than the number of cable modems 50 to upgrade in a subscriber network cable modem implementation.

Manual configuration of the HFC topology of HFC network 4 could generally be performed after fiber nodes 40 and cable modems 50 in subscriber networks 6 have been wired. When a manual configuration has not been completed, upstream and downstream ports at CMTS 30 (e.g., ports 39 and 37), assignments in the MAC domain, and CMTS service groups may not be known to CMTS 30. Furthermore, if changes occur in the HFC topology after the initial HFC topology configuration is completed, the changes may not be known to CMTS 30 until manual updates are performed at CMTS 30.

In a fiber node implementation operating in the discovery mode, fiber nodes such as fiber node 40*a*, can be configured to tune OFF or loop their subscriber facing ports 48 until their embedded cable modems 43 successfully register and receive permission to tune ON subscriber facing ports 48, by default. This behavior may be changed by manual configuration of the fiber nodes by an operator, if needed. This manual configuration could be a one-time configuration to change the default behavior of the fiber nodes. This change can help avoid bringing cable modems, such as cable modems 50*a*-50*c*, on-line until the HFC topology discovery is completed and an HFC topology map is accessible to CMTS 30.

CMTS 30 can be configured to allow embedded cable modems 43 to come on-line and communicate without receiving HFC topology information (e.g., in an MDD message). In one embodiment, this can be accomplished by allowing the embedded cable modems 43 to come on-line in a DOCSIS mode that does not require the MDD message with HFC topology information, such as DOCSIS 1.0, 1.1, or 2.0. Thus, embedded cable modems 43 can bootstrap to CMTS 30 to allow the HFC topology to be discovered and configured.

Cable modem identifier module 33 of CMTS 30 can identify fiber nodes 40 through a device type (or class type) encoded by their embedded cable modems (e.g., embedded cable modem 43) during registration (e.g., bootstrap registration for discovery mode, DOCSIS 3.0 registration for verification mode). Fiber nodes 40 may also (or alternatively) be identified by an identifier such as a MAC address, which can be assigned to each embedded cable modem. Once fiber nodes 40 have been identified, topology discovery and verification module 35 can poll (e.g., ping, solicit, interact with, request information from) each fiber node, such as fiber node 40*a*, to invoke a scanning module, such as scanning module 44, to obtain information needed to construct the HFC topology. Note that the term 'polling' as discussed herein can include any suitable exchange of data between two points. Polling could be configured as event-driven or time-driven (e.g. periodic) and is intended to encompass communications that request information or data from another network element or component (e.g., cable modem 43).

CMTS 30 can add or stamp a port identifier in the polling message, where the port identifier identifies the downstream port over which the polling message is being transmitted. If multicast polling is used, then the downstream port identifier stamping can happen on downstream RF network 36 (e.g., an LC network). If unicast polling is used, however, then downstream port identifier stamping can happen on the routing processor/processor engine (RP/PRE) (e.g., processor 31), if the unicast polling message is communicated via the identified downstream port.

In one embodiment, a unique identifier represents each downstream frequency associated with each downstream port. An identifier can be configured as any suitable attribute or data (e.g., text, numeric, binary, etc.) that serves to uniquely identify a downstream frequency associated with a particular downstream port of the CMTS. A downstream frequency may be 'associated' with a particular downstream port if the downstream frequency is originated, generated, transmitted, sent, or otherwise communicated from the downstream port. In one example embodiment, an identifier can be a channel identifier assigned to a channel corresponding to the frequency. An identifier may be assigned by CMTS 30 to a frequency from a particular port and carried by that frequency to a cable modem (e.g., embedded cable modem 43). If a downstream frequency from a particular port is split between fiber nodes, then each of the resultant downstream frequencies can carry the same identifier representing the frequency and associated port. For example, if a downstream frequency of 6.6 MHz from port 1, with an identifier of 100, is split between three fiber nodes, then the three resultant 6.6 MHz downstream frequencies from port 1 can each carry the identifier 100 to the three corresponding fiber nodes. On the other hand, different downstream frequencies from the same or different ports, or the same downstream frequencies from different ports, can be assigned different identifiers.

In one embodiment, when the polling message is received by embedded cable modem 43, the incoming port of CMTS facing ports 46 on which the polling message is received can be recorded. Scanning module 44 of embedded cable modem 43 can do a full sweep scan (i.e., scanning through an entire frequency range) and record information indicating which frequencies are detected by embedded cable modem 43. A response message can be constructed containing a report of important information to help build (or verify) the HFC topology. The information can include identifiers that represent each of the frequencies detected by embedded cable modem 43 and possibly a cookie value that CMTS 30 is expecting to receive (e.g., a cookie value provided in a polling message from CMTS 30). The response message may also be stamped with the upstream port information of CMTS facing ports 46 and communicated to CMTS 30 as a unicast packet on each of its upstream ports.

In some embodiments, when the HFC topology is being discovered and, therefore, the cable modem is merely bootstrapped to CMTS 30, the response message may not be communicated to all of the possible upstream ports of a particular fiber node. Instead, for example, the response message may be communicated to a single upstream port. If the HFC topology is being verified, however, then the cable modem has been registered and, therefore, the response messages could be communicated to each of the possible upstream ports of the particular fiber node.

Topology discovery and verification module 35 can collect response messages from fiber nodes, such as fiber node 40*a*, on each upstream port 39 on which a response message is received. A set of downstream and upstream ports associated with frequencies detected by each fiber node can be generated from the collected response messages. Additionally, the response messages can be evaluated to determine where fiber node splitting has occurred. If the same identifier is indicated in response messages from two or more fiber nodes, then an inference can be made that the frequency represented by the identifier was split between the two or more fiber nodes. Similarly, if a response message is received from different fiber nodes on the same port via the same frequency, then an inference can be made that the fiber nodes share an upstream frequency. Thus, the topology of CMTS upstream service groups can be determined where fiber nodes sharing the same upstream frequency to the same CMTS port are included in the same CMTS upstream service group. The topology of CMTS downstream service groups can be determined where fiber nodes sharing the same downstream frequency from the same CMTS port are included in the same CMTS downstream service group. A complete CMTS service group topology can be determined by combining CMTS upstream and downstream service groups having a common fiber node. A complete HFC topology map can be constructed by determining the topology of these service groups.

Once a complete HFC topology map has been constructed, MAC domain service groups and cable modem (CM) service groups may also be determined. The MAC domain service groups may be determined by identifying the complete sets of downstream and upstream channels of each MAC domain. The CM service groups may be determined by identifying the complete set of downstream and upstream channels that can be received by a single subscriber cable modem. Furthermore, each subscriber cable modem 50 can be mapped to a particular fiber node, which can be useful for operational purposes, for example, to identify and notify selected subscribers prior to scheduled fiber node maintenance.

In one embodiment, port-mapping database 22 is configured to store the HFC topology configuration (also referred to herein as 'HFC topology map'). Accordingly, information derived from the response messages including downstream and upstream CMTS ports corresponding to each fiber node, CMTS service groups (e.g., downstream, upstream, and complete CMTS service groups), etc. may be stored in port-mapping database 22. MAC domain service group information and CM service group information may also be stored in some repository of CMTS 30, such as port-mapping database 22.

In a simple example of a CMTS, consider fiber nodes (FNs) and corresponding cable modems or subscribers (Subs): FN1----Sub1-1, 1-2, 1-3 . . . 1-n \ FN2----Sub2-1, 2-2, 2-3 . . . 2-n \ FNm----Subm-1, m-2, m-3 . . . m-n. For this example topology, assume the fiber node connections to downstream and upstream ports and their assignments to a MAC domain have not yet been configured in the CMTS. Topology discovery and verification module 35 can automatically generate the set of downstream and upstream ports per fiber node for each fiber node by collecting the fiber nodes' responses to polling messages on upstream ports, and can accommodate common combining and/or splitting that can occur in an HFC plant topology. For example, the example CMTS could be determined to have the following CMTS view of plant topology: CMTS 5/0----1/1--FN1----Sub1-1, 1-2, 1-3 . . . 1-n \ --6/0----1/2--FN2----Sub 2- 1, 2-2, 2-3 . . . 2-n \ --7/0----1/1--FNm----Subm-1, m-2, m-3 . . . m-n.

In addition to enabling discovery of an HFC topology, system 20 may provide a verification mode in which scanning modules 44 in embedded cable modems 43 of fiber nodes, such as fiber node 40a, can communicate with discovery and verification module 35 to enable verification of a previously configured HFC topology map. In this aspect of the embodiment, CMTS 30 is already configured with the HFC topology of HFC network 4, either through automatic discovery or manual configuration. Embedded cable modems 43 of fiber nodes 40 can register (e.g., in DOCSIS 3.0) and come on-line in cable network 10. At a desired point in time, or periodically, a selected set of components (e.g., one or more fiber nodes, one or more subscriber cable modems, one or more service groups, the entire CMTS, etc.) can be selected for topology verification.

In verification mode, cable modem identifier module 33 can identify cable modems of the selected components to be verified. A polling message can be sent to selected cable modems 43 and scanning module 44 can scan for frequencies in the same or similar manner as described with reference to the discovery function. Response messages from embedded cable modems 43 to CMTS 30 can provide information (e.g., downstream frequency/port identifiers) to enable CMTS 30 to construct the HFC topology (or the selected portion thereof) and determine whether it matches the HFC topology map stored in CMTS 30 (e.g., in port mapping database 22). If any portion of the constructed HFC topology does not match the stored HFC topology map, then any appropriate action may be taken (e.g., error reporting, taking a cable modem with errors off line, etc.).

Although topology discovery and verification module 35 could be implemented to provide both topology discovery and verification functions, these functions could easily be separated and provided in a cable network independent and/or exclusive of each other.

In a subscriber cable modem implementation of system 20, topology discovery and verification module 35 can provide discovery and verification functions by communicating with subscriber cable modems, such as cable modems 50a-c. A subscriber cable modem 50a and its scanning module 54 can operate in a substantially similar way as an embedded cable modem 43 and its scanning module 44, shown in fiber node 40a. In the subscriber cable modem implementation, however, the polling messages are communicated from CMTS 30 to subscriber cable modems 50, frequencies are scanned by scanning module 54, and response messages are constructed and sent by subscriber cable modem 50 back to CMTS 30. One or more fiber nodes 40 bridge the communications between CMTS 30 and subscriber cable modems 50.

Topology discovery and verification module 35 can derive information from the response messages in the same or similar manner as in the fiber node implementation in which response messages are received from embedded cable modems 43 of fiber nodes 40. Thus, an HFC topology map can be constructed including information such as downstream and upstream ports for each fiber node, CMTS service groups (e.g., downstream, upstream, and complete CMTS service groups), etc., and may be stored in port-mapping database 22. Moreover, this embodiment in which the scanning is performed by subscriber cable modems 50 can also provide subscriber cable modem information in each response message. Accordingly, such information can allow subscriber cable modems 50 to be mapped to their corresponding fiber nodes 40 and CMTS ports as the HFC topology is being constructed during discovery or verification.

Figure 3:
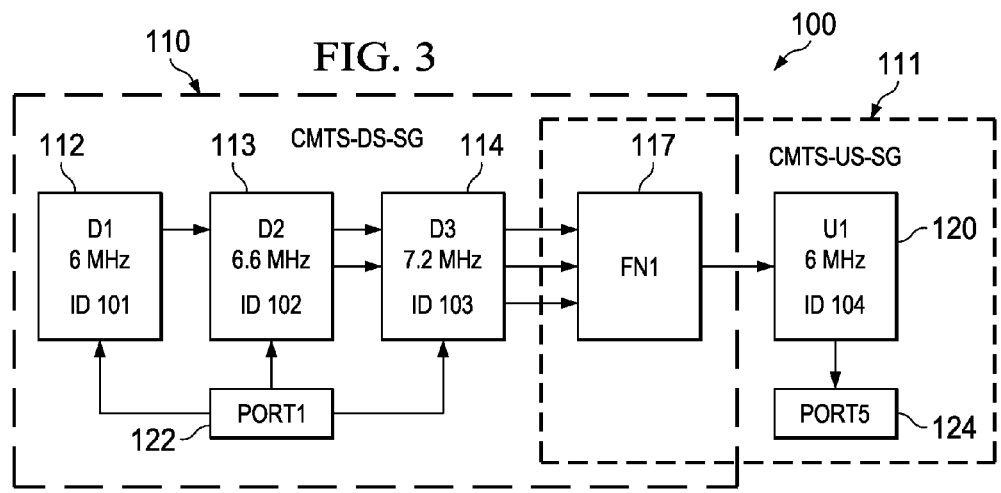
FIG. 3 is a simplified frequency space diagram that illustrates an example configuration between downstream and upstream radio frequency (RF) channels and fiber nodes without splitting downstream frequencies between fiber nodes.
Figure 4:
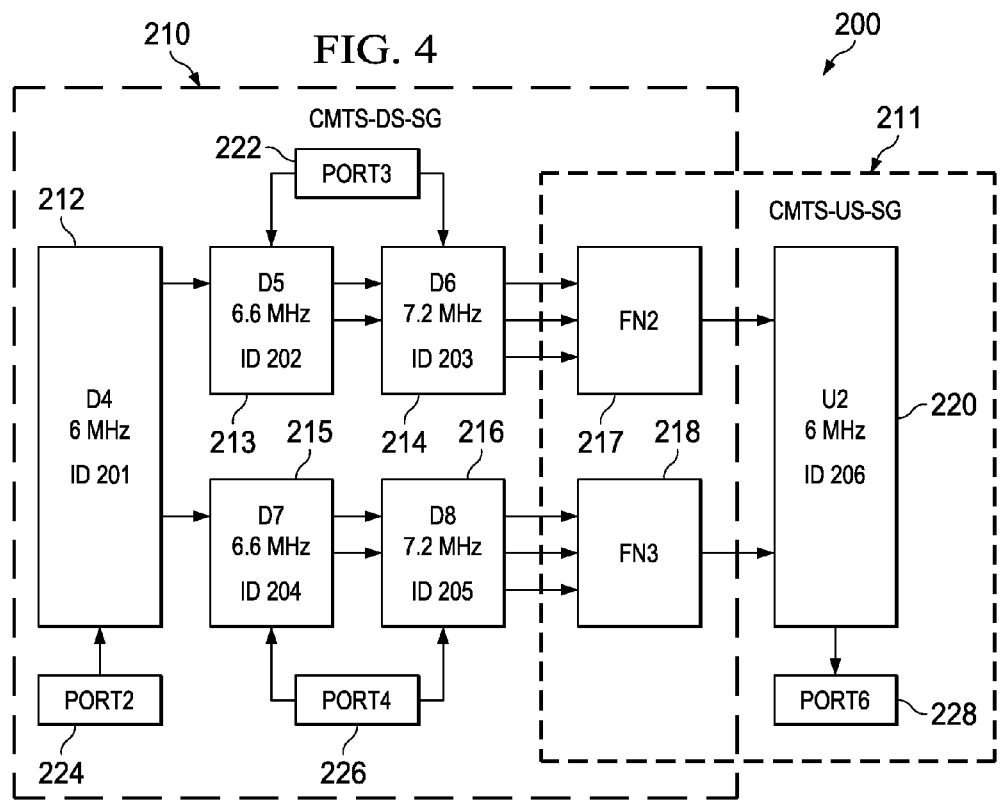
FIG. 4 is a simplified frequency space diagram that illustrates an example configuration between downstream and upstream radio frequency (RF) channels and fiber nodes with a downstream frequency split between fiber nodes and upstream frequencies combined from different fiber nodes.

Turning to FIGS. 3 and 4, frequency space diagrams illustrate example first and second CMTS service groups 100 and 200, respectively, in a cable network such as cable network 10 with CMTS 30. The configuration of downstream and upstream frequencies, ports, and corresponding fiber nodes are illustrated in the exemplary CMTS service groups 100 and 200. In FIG. 3, none of the downstream frequencies are split (or shared) between fiber nodes. Downstream signals can be transmitted to fiber node 117 (FN1) at different frequencies associated with downstream channels 112, 113, and 114 (D1, D2, and D3, respectively), and, potentially, can be generated from the same downstream port 122 (PORT1) at CMTS 30. For purposes of illustration in FIG. 3, frequencies of 6 MHz, 6.6 MHz, and 7.2 MHz are generated by PORT1 and associated with downstream channels D1, D2, and D3, respectively. In this example scenario, the frequencies of D1, D2, and D3 are represented by respective unique identifiers ID 101, ID 102, and ID 103, which can be carried by respective downstream frequencies to FN1. Moreover, in the example scenario shown in FIG. 3, FN1 is fed only by frequencies of downstream channels D1, D2, and D3, and these frequencies (from PORT1) are not shared with any other fiber nodes. Thus, the topology of first CMTS downstream service group (CMTS-DS-SG) 110 includes FN1, the downstream frequencies that are represented by ID 101, ID 102, and ID 103, and PORT1.

In the example shown in FIG. 3, upstream signals can be transmitted at an upstream frequency (i.e., 6 MHz) associated with upstream channel 120 (U1) from FN1 to upstream port 124 (PORT5) at CMTS 30. In this example scenario, the upstream frequency received at PORT5 may be represented by unique identifier ID 104 and is not shared any other upstream signals from other fiber nodes. Accordingly, FN1, the upstream frequency generated by FN1 (and represented by ID 104), and PORT5 define the topology of first CMTS upstream service group (CMTS-US-SG) 111.

During a discovery or verification process, an embedded cable modem in FN1 (or subscriber cable modems 50 connected to FN1) can scan for frequencies and detect downstream frequencies of channels D1, D2, and D3. FN1 can provide a response message to CMTS 3 indicating that it detected downstream frequencies 6 MHz, 6.6 MHz, and 7.2 MHz represented by respective identifiers ID 101, ID 102, and ID 103. The response message can be provided via the upstream frequency of channel U1 to PORT5 of CMTS 30. Topology discovery and verification module 35 in CMTS 30 can evaluate the response message and, if no other response messages containing ID 101, ID 102, or ID 103 are received from other fiber nodes, then module 35 can determine that the downstream frequencies represented by ID 101, ID 102, and ID 103 are provided only to FN1 and are not shared with any other fiber nodes. Accordingly, the topology of first CMTS downstream service group (CMTS-DS-SG) 110 can be determined. In this scenario, the topology of first CMTS-DS-SG 110 includes FN1, downstream frequencies represented by ID 101, ID 102, and ID 103, and PORT1.

Topology discovery and verification module 35 can also determine the topology of CMTS upstream service groups (CMTS-US-SGs). In this example scenario, response messages from FN1 are received on PORT5 at 6 MHz frequency. Thus, first CMTS-US-SG 111 includes FN1, the upstream frequency of the response message (i.e., 6 MHz), and PORT5. The topology of a complete CMTS service group (CMTS-SG) 100 can also be determined when the topologies of the CMTS upstream and downstream service groups have been determined. The combined topology of CMTS-DS-SG 110 and CMTS-US-SG 111 define CMTS service group (CMTS-SG) 100. Thus, downstream frequencies of first CMTS-DS-SG 110, upstream frequencies of first CMTS-US-SG 111, FN1, PORT1, and PORT5 are included in the topology of first CMTS-SG 100.

In the frequency space diagram of FIG. 4, a downstream frequency of 6 MHz from downstream port 224 (PORT2) of CMTS 30 is split (or shared) between fiber node 217 (FN2) and fiber node 218 (FN3). The 6 MHz downstream frequency from PORT2 is associated with downstream channel 212 (D4) and is represented by unique identifier ID 201. Downstream signals can also be transmitted to FN1 at different frequencies associated with downstream channels 213 and 214 (D5 and D6, respectively), and can be generated from the same downstream port 222 (PORT3) at CMTS 30. In addition, downstream signals can be transmitted to FN3 at different frequencies associated with downstream channels 215 and 216 (D7 and D8, respectively), and can be generated from another downstream port 226 (PORT4) at CMTS 30. For purposes of illustration, frequencies of 6.6 MHz and 7.2 MHz are generated from PORT3 and associated with D5 and D6, respectively, and frequencies of 6.6 MHz and 7.2 MHz are generated from PORT4 and associated with D7 and D8, respectively.

In this example scenario, the frequencies associated with D5 and D6 are represented by unique identifiers ID 202 and ID 2, respectively, which can be carried by respective downstream frequencies to FN2. The frequencies associated with D7 and D8 are represented by unique identifiers ID 204 and ID 205, respectively, which can be carried with respective downstream frequencies to FN3. The frequency associated with D1 is represented by unique identifier ID 201 and is split between FN2 and FN3. Therefore, ID 201 can be carried by downstream frequencies to both FN2 and FN3. Because FN2 and FN3 share a frequency from the same downstream port (i.e., 6 MHz from PORT2), the topology of second CMTS downstream service group (CMTS-DS-SG) 210 includes FN2, FN3, the frequencies that are represented by ID 201 through ID 205, and the ports that feed FN2 and FN3 (i.e., PORT2, PORT3, and PORT4).

In the example shown in FIG. 4, upstream signals can be transmitted at an upstream frequency (i.e., 6 MHz) associated with an upstream channel 220 (U2) from FN2 and FN3 to upstream port 228 (PORT6) of CMTS 30. In this example scenario, the upstream frequency received at PORT6 may be represented by unique identifier ID 206, and shared with FN2 and FN3. Accordingly, FN2, FN3, the upstream frequency shared by FN2 and FN3, and PORT6 define the topology of second CMTS upstream service group (CMTS-US-SG) 211.

During a discovery or verification process, an embedded cable modem in FN2 (or subscriber cable modems 50 connected to FN2) can scan for frequencies and detect downstream frequencies of channels D4, D5, and D6, and an embedded cable modem in FN3 (or subscriber cable modems 50 connected to FN3) can scan for frequencies and detect downstream frequencies of channels D4, D7, and D8. FN2 can provide a response message to CMTS 30 indicating that it detected downstream frequencies of 6 MHz, 6.6 MHz, and 7.2 MHz represented by respective identifiers ID 201, ID 202, and ID 203. FN3 can provide a response message to CMTS 30 indicating that it detected downstream frequencies of 6 MHz, 6.6 MHz, and 7.2 MHz represented by respective identifiers ID 201, ID 204, and ID 205. The response messages from FN2 and FN3 can be provided via the upstream frequency of channel U2 to PORT6 of CMTS 30.

Topology discovery and verification module 35 in CMTS 30 can evaluate the response messages and, because response messages from both FN2 and FN3 contain ID 201, it can determine that the downstream frequency represented by ID 201 (i.e., 6 MHz frequency from PORT2) is split between FN2 and FN3. Accordingly, the topology of the second CMTS downstream service group (CMTS-DS-SG) 210 can be determined. In this scenario, the topology of second CMTS-DS-SG 210 includes FN2, FN3, downstream frequency represented by ID 201 (generated from PORT2), the downstream frequencies represented by ID 202 and ID 203 (generated from PORT3), the downstream frequencies represented by ID 204 and ID 205 (generated by PORT4), PORT2, PORT3, and PORT4.

Topology discovery and verification module 35 can also determine the topology of CMTS upstream service groups (CMTS-US-SGs). In this example scenario, the response messages from FN2 and FN3 are received on PORT6 at 6 MHz frequency, so it can be determined that FN2 and FN3 share an upstream frequency. Thus, the topology of a second CMTS-US-SG 211 includes FN2, FN3, the upstream frequency of the response messages (i.e., 6 MHz), and PORT6. The topology of second complete CMTS service group (CMTS-SG) 200 can be determined when the topologies of the second CMTS upstream and downstream service groups 210 and 211 have been determined. The combined topology of CMTS-DS-SG 210 and CMTS-US-SG 211 define CMTS service group (CMTS-SG) 200. Thus, FN2, FN3, downstream frequencies of second CMTS-DS-SG 210, upstream frequencies of second CMTS-US-SG 211, and all associated ports (i.e., PORT2, PORT3, PORT4, and PORT6) are included in the topology of second CMTS-SG 200.

Information related to the CMTS service groups can be stored or updated in a memory element of CMTS, such as port mapping database 22. In one embodiment, the information could be stored in a storage structure such as CMTS service group table 500 in FIG. 5. Table 500 identifies each CMTS service group (downstream, upstream, or complete SG) and their associated ports, fiber nodes, and RF channels (or corresponding frequencies). In one embodiment, table 500 could be configured to delineate which ports, downstream frequencies, and upstream frequencies are associated with each fiber node in a CMTS service group. In example embodiments, the information stored in port mapping database 22 represents an HFC topology map.

Information related to cable modem service groups and MAC domain service groups may also be stored in a memory component of CMTS. In one embodiment, the information could be combined with CMTS service group table 500 of FIG. 5 in port-mapping database 22. Alternatively, the CM service group information and/or MAC domain service group information could be separately provided in port-mapping database 22 or in any other suitable memory component of CMTS.

Figure 6:
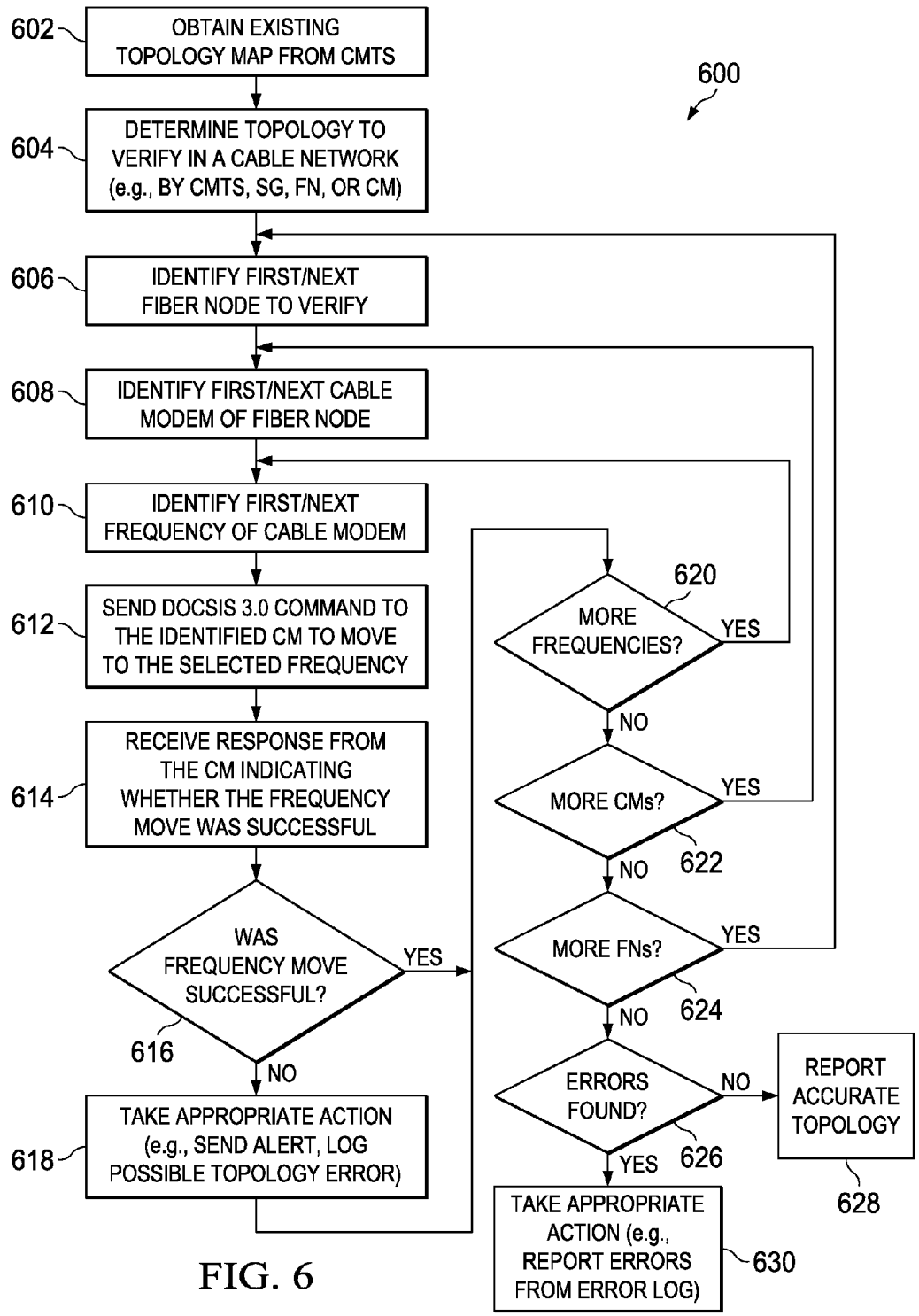
FIG. 6 is a simplified flow chart of example operational steps that may be associated with embodiments of the system.

FIG. 6 is an example flowchart depicting a verification flow 600 for verifying the HFC topology in a cable network (e.g., cable network 10) using existing equipment (e.g., subscriber cable modems 50). In one example embodiment, verification flow 600 may be implemented in topology verification module 34 of CMTS 30 and configured such that CMTS 30 communicates with subscriber cable modems 50 that are registered (e.g., in accordance with DOCSIS 3.0) and on-line in cable network 10, in order to verify the HFC topology. This in-band verification process enables CMTS 30 to dynamically learn that the HFC topology has changed (e.g., fiber node splitting has occurred due to load balancing) and to provide appropriate information to update the HFC topology map.

At 602, an existing HFC topology map is obtained from CMTS 30. The existing HFC topology map may have been manually configured and stored in the CMTS. The HFC topology map could be stored in an HFC topology configuration database (not shown), port-mapping database 22, or any other suitable storage element locally or remotely accessible by CMTS 30.

At 604, a determination is made regarding which portion of HFC topology of cable network 10 to verify. Topology verification module 34 could be configured to allow an operator to specify (e.g., through a user interface) which components of cable network 10 to include in the verification process. For example, an operator could request topology verification of the entire CMTS, one or more fiber nodes 40, one or more subscriber cable modems 50, or one or more service groups. A sequential looping process can be provided from 606 through 624 in which each frequency of each cable modem 50 of each fiber node 40 in the topology to be verified is tested to determine whether the existing HFC topology map is correctly configured. If specific cable modems 50 are selected for verification, however, then the looping process could be configured to verify only the selected cable modems 50 of the identified fiber nodes.

At 606 a first fiber node in the topology to verify is identified and at 608 a first subscriber cable modem 50 associated with the first fiber node is identified. At 610, a first frequency in the HFC topology configuration (e.g., defined by cable modem service group or MAC domain cable modem service group) that is associated with the current cable modem is identified and a command can be sent to the current cable modem 50 at 612 to instruct the cable modem to move to the identified frequency. In DOCSIS 3.0, this feature is referred to as 'Dynamic Channel Change'. A Dynamic Channel Change Request (DCC-REQ) may be transmitted by CMTS 30 to cause a cable modem to change the upstream channel on which it is transmitting, the downstream channel on which it is receiving, or both. At 614, a Dynamic Channel Change Response (DCC-RSP) may be received by CMTS 30 from cable modem 50 with a confirmation code indicating whether the move to the requested frequency was successful.

A determination can be made at 616 as to whether the frequency move requested of current cable modem 50 was successful. If the attempt to move to the requested frequency failed (e.g., confirmation code has value indicating the current cable modem was unable to move to the requested frequency), then appropriate action may be take at 618 such as, for example, sending an alert to a cable operator, logging a possible topology error, etc. The topology error may be considered a 'possible error' until it is confirmed (e.g., by a cable operator). Although receiving a DCC-RSP message indicating the requested frequency move was unsuccessful is likely to indicate a topology error, other factors may also result in a similar DCC-RSP message. For example, dropped messages may cause the frequency move to fail. In some embodiments, reporting on the topology errors may be performed after all of the cable modems in the selected topology to verify have been processed.

After the appropriate action is taken at 618 if the frequency move was unsuccessful, or if the frequency move was successful as determined at 616, then a determination is made at 620 as to whether more frequencies are configured in the HFC topology map for the current cable modem. If there are more frequencies, then flow loops back to 610 to identify the next frequency in the HFC topology map that is associated with the current cable mode. In this way, each frequency associated with the current cable modem in the HFC topology map can be sequentially evaluated in the same way to determine whether a topology error exists, and if so, to take appropriate action at 618. Alternatively, all possible frequencies (e.g., 168 potential frequencies), rather than just the frequencies associated with a particular cable modem in the HFC topology configuration at CMTS 30, could be evaluated to determine every frequency that can be accessed by the particular cable modem.

If no more frequencies are associated with the current cable modem, as determined at 620, then a determination can be made at 622 as to whether more cable modems are associated with the current fiber node (or whether the selected group of cable modems to be verified has been exhausted when specific cable modems are selected for verification). If there are more cable modems to be verified, then flow can loop back to 608 to identify the next cable modem. Flow continues at 610 through 620, in which all frequencies associated with the current cable modem can be identified and evaluated using the DCC-REQ commands. Each cable modem associated with the currently identified fiber node (or each cable modem within a selected set of cable modems to be verified) may be identified and its associated frequencies evaluated.

Once all cable modems associated with the current fiber node have been evaluated as determined at 622, then flow can move to 624 where a determination is made as to whether more fiber nodes are within the selected topology to be verified. If there are more fiber nodes, then flow loops back to 606 where the next fiber node in the selected topology is identified. Flow continues at 608 where each cable modem associated with the current fiber node is sequentially processed, and each frequency associated with each cable modem is sequentially evaluated using the DCC-REQ commands.

After all fiber nodes in the selected topology to verify have been processed, as determined at 624, flow passes to 626 where a determination is made as to whether any errors in topology were found (e.g., if a confirmation code in a DCC-RSP message indicated that a frequency move was unsuccessful or failed). If no errors were found, then flow passes to 628 where a report may be generated indicating the selected plant topology is accurate and verified. If it is determined at 626 that errors were found, however, then flow passes to 630 where appropriate action is taken, such as reporting the possible topology errors logged at 618. In some embodiments, an option to take the cable modem off-line may be available if, for example, the topology error is confirmed and determined to be malicious theft of service.

Figure 7:
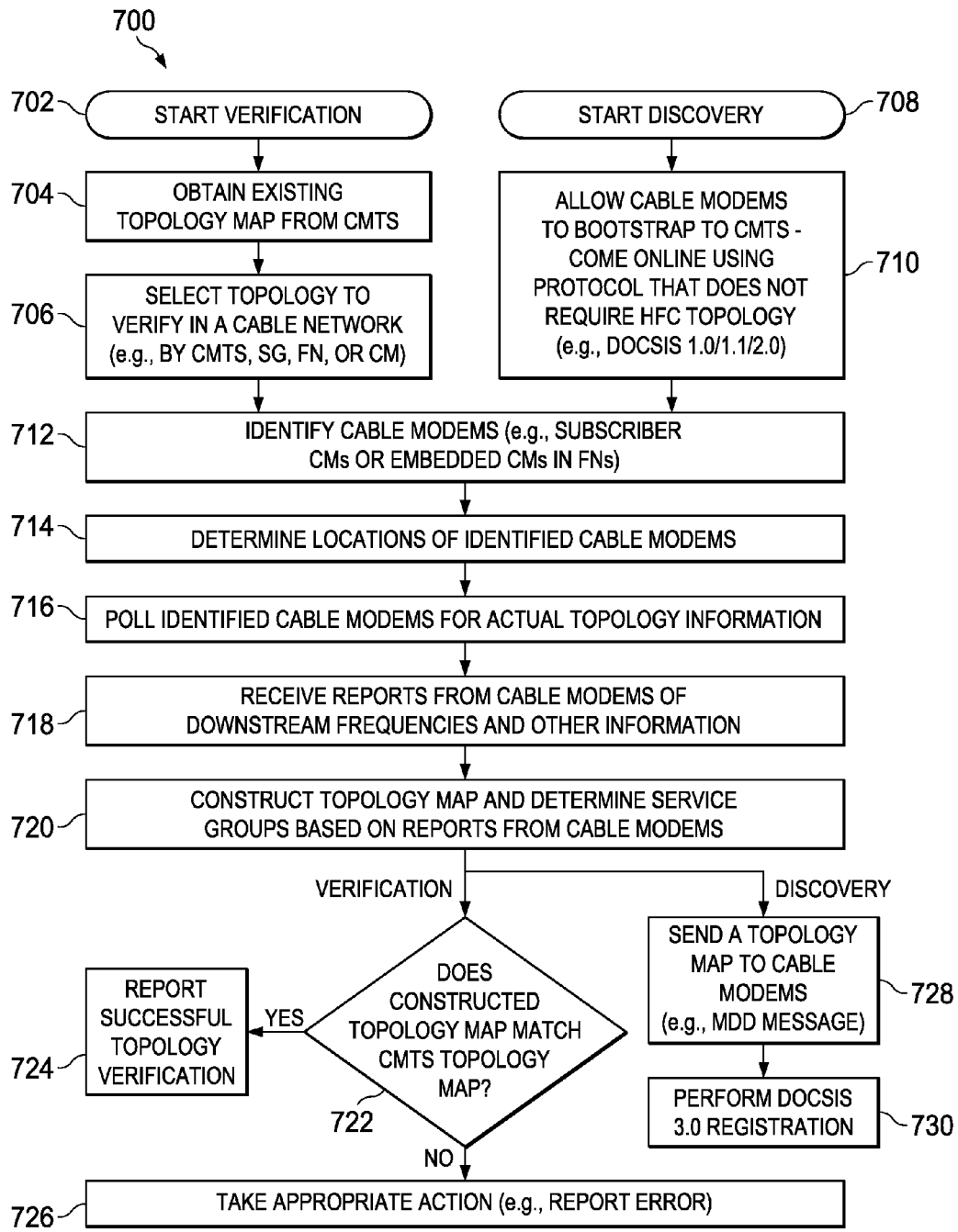
FIG. 7 is a simplified flow chart of example operational steps that may be associated with embodiments of the system.

FIG. 7 is an example flowchart depicting a combined discovery and verification flow 700 of a CMTS (e.g., CMTS 30) for discovering and/or verifying the HFC topology in a cable network (e.g., cable network 10). In example embodiments, discovery and verification flow 700 may be implemented in topology discovery and verification module 35 of CMTS 30 and may cooperate with scanning modules configured in embedded cable modems of fiber nodes (in a fiber node implementation) or in subscriber cable modems (in a subscriber cable modem implementation) to provide an in-band method of HFC topology discovery and verification.

At 708, a discovery mode of flow 700 begins to dynamically determine the HFC topology of an HFC network, which can obviate the need to manually configure the HFC topology at a CMTS. The discovery portion of flow 700 can be performed before cable modems (embedded cable modems or subscriber cable modems) have registered in accordance with standards that require knowledge of the HFC topology (e.g., DOCSIS 3.0). For ease of reference, the description of flow 700 will predominantly reference a fiber node implementation in which communications to discover and verify HFC topology can occur between CMTS 30 and embedded cable modems of fiber nodes (e.g., embedded cable modem 43 of fiber node 40*a*). Alternatively, in a subscriber cable modem implementation, communications to discover and verify HFC topology can occur between CMTS 30 and subscriber cable modems (e.g., subscriber cable modems 50). In this subscriber cable modem implementation, the discovery and verification could be accomplished in the same or substantially similar way as in the fiber node implementation, in accordance with the broad scope of this disclosure.

CMTS 30 can be configured to allow embedded cable modems 43 of fiber nodes 40 to bootstrap to CMTS 30 in order to discover the HFC topology of cable network 10. Accordingly, at 710, embedded cable modems 43 of fiber nodes 40 in cable network 10 can come online using a protocol that does not require knowledge of the HFC topology (e.g., DOCSIS 1.0/1.1/2.0, etc.). At 712, CMTS 30 can identify embedded cable modems 43 of fiber nodes 40 that are bootstrapped to CMTS 30. In one embodiment, CMTS may identify the fiber nodes through the device type (or class type) encoded by the embedded cable modem of the fiber node during registration (e.g., bootstrap registration in the discovery mode, DOCSIS 3.0 registration in the verification mode) and/or by a MAC address, which has been previously assigned to the embedded cable modem.

In a potential embodiment, at 714 a fiber node's physical location may be received by CMTS 30 from the fiber node (e.g., from an on-board global positioning system (GPS) or from coordinates input during initial installation of the fiber node). Such information may be used to calculate the distance between CMTS 30 and the particular fiber node for operational benefits such as, for example, radio frequency issues, debugging, etc. In one implementation, a new field may be provided in the DOCSIS message sent from embedded cable modem 43 to CMTS 30. Alternatively, a management information base (MIB) may be used to convey the physical location information to CMTS 30.

At 716, CMTS 30 can poll each of the identified embedded cable modems 43 of identified fiber nodes 40 to request information needed to construct the HFC topology. The polling could be event-driven or time-driven. Each polling message could include a cookie value that CMTS 30 expects to be returned by the embedded cable modem that receives it. In addition, downstream RF networks 36 can add an identifier for each DS port 37 over which the messages are transmitted, with each DS channel (or frequency) from a port having a unique identifier. CMTS 30 can add or stamp the identifiers on each polling message. If multicast polling is used, then the downstream identifier stamping happens on downstream RF network 36 (e.g., an LC network). If unicast polling is used, however, then downstream identifier stamping can happen on the routing processor/processor engine (RP/PRE) (e.g., processor 31), as long as the unicast polling message is communicated via the identified downstream port.

At 718, CMTS 30 receives response messages from embedded cable modems 43 of fiber nodes 40 that were polled at 716. The response messages can contain reports of downstream frequencies detected and other information. For example, embedded cable modem could send a response message with a report indicating which frequencies were detected after embedded cable modem 43 scanned for an entire frequency range. The report could include identifiers that were assigned to each downstream frequency at the headend and any cookie values received in the polling messages. The response messages can be received on upstream ports (e.g., upstream ports 39) via upstream frequencies accessible to the fiber nodes. Each response message could also include a stamp with the upstream port information of the corresponding fiber node.

Topology discovery and verification module 35 of CMTS 30 can construct an HFC topology map at 720 based on the response messages received from the embedded cable modems of fiber nodes 40. CMTS 30 can generate the set of DS and US ports per fiber node for each fiber node and can determine the corresponding CMTS service groups. In example embodiments, the CMTS service groups (downstream SGs, upstream SGs, and complete SGs), including associated CMTS ports, downstream channels, upstream channels, and fiber nodes can be stored in port-mapping database 22 to define the constructed HFC topology map. Additionally, any other suitable information relevant to the HFC topology map may also be stored in port-mapping database 22.

Once discovery has been completed, and the HFC topology map has been configured, a selected portion of the HFC topology map may be transmitted at 728 to embedded cable modems 43 of fiber nodes 40, for example, in the form of a MAC domain descriptor (MDD) message. Accordingly, at 730, embedded cable modems 43 in fiber nodes 40 may register in accordance with DOCSIS 3.0. In addition, subscriber cable modems 50 connected to the fiber nodes may also register with CMTS 30 and come on-line in cable network 10.

A verification mode of flow 700 starts at 702 and can be performed after the cable modems have registered with CMTS 30, for example, in accordance with DOCSIS 3.0 standards. This in-band verification process enables CMTS 30 to dynamically learn that the HFC topology of HFC network 4 has changed (e.g., fiber node splitting has occurred due to load balancing) and to provide appropriate information to update the HFC topology map. At 704, an existing HFC topology map is obtained from CMTS 30. The existing HFC topology map may have been automatically generated from discovery operations of topology discovery and verification module 35, as previously described herein. Alternatively, the existing HFC topology map may have been manually configured. The HFC topology map could be stored in port-mapping database 22 or in any other suitable storage element in CMTS 30 or locally or remotely accessible by CMTS 30.

At 706, a determination is made regarding which portion of HFC topology of cable network 10 to verify. Topology discovery and verification module 35 could be configured to allow an operator to specify (e.g., through a user interface) which components of HFC network 4 to include in the verification process. For example, an operator could request topology verification of the entire CMTS, one or more fiber nodes 40, one or more subscriber cable modems 50, or one or more service groups.

Once the topology to verify is determined in 706, the verification process can proceed in a substantially similar manner in steps 712-720 as previously described herein. Depending on whether the system is configured as a fiber node implementation or a subscriber cable modem implementation, cable modems that are identified for verification at 712 include either embedded cable modems 43 or subscriber cable modems 50.

After the response messages are received from the identified cable modems (embedded CMs or subscriber CMs) at 718, and an HFC topology map is constructed at 720, flow continues at 722 where a determination is made as to whether the constructed HFC topology map matches the existing HFC topology map of CMTS 30. If only a selected portion of the HFC network is being verified, the constructed HFC topology map may be compared to the corresponding portion of the existing HFC topology map. If the determination is made at 722 that the constructed HFC topology map matches the existing HFC topology map (or the corresponding portion thereof), then no errors were found and flow passes to 724 where a report may be generated indicating the selected plant topology is accurate and verified. If any portions of the constructed HFC topology do not match the existing HFC topology map, however, then any appropriate action may be taken. For example, appropriate actions may include generating an error report indicating the discrepancies, sending an alert to a cable operator, logging the discrepancies, etc. In some embodiments, an option to take the cable modem associated with the discrepancies off-line may be available if, for example, the topology error is confirmed and determined to be malicious theft of service.

Figures 5, 8:
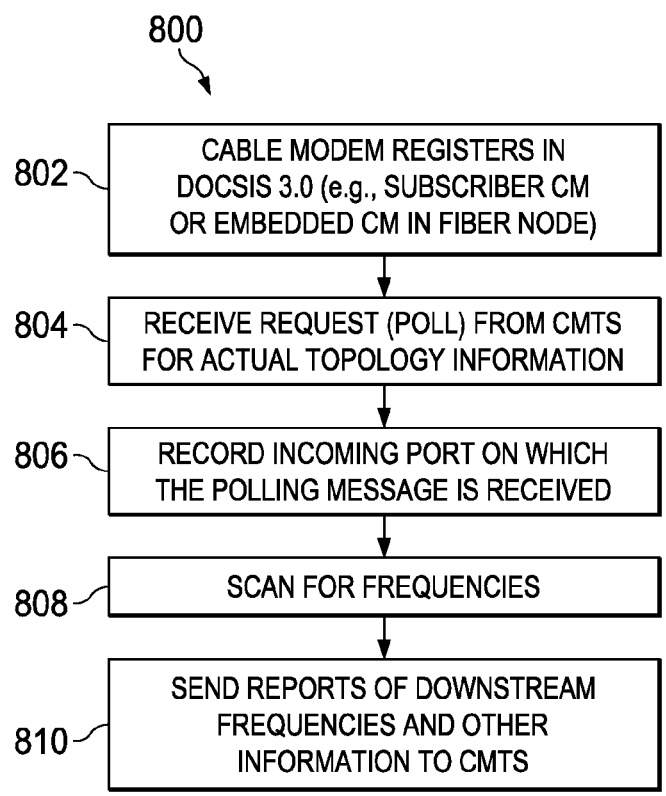
FIG. 5 illustrates an example cable modem termination system (CMTS) service group table in accordance with embodiments of the present disclosure.
FIG. 8 is a simplified flow chart of example operational steps that may be associated with embodiments of the system.
Figure 9:
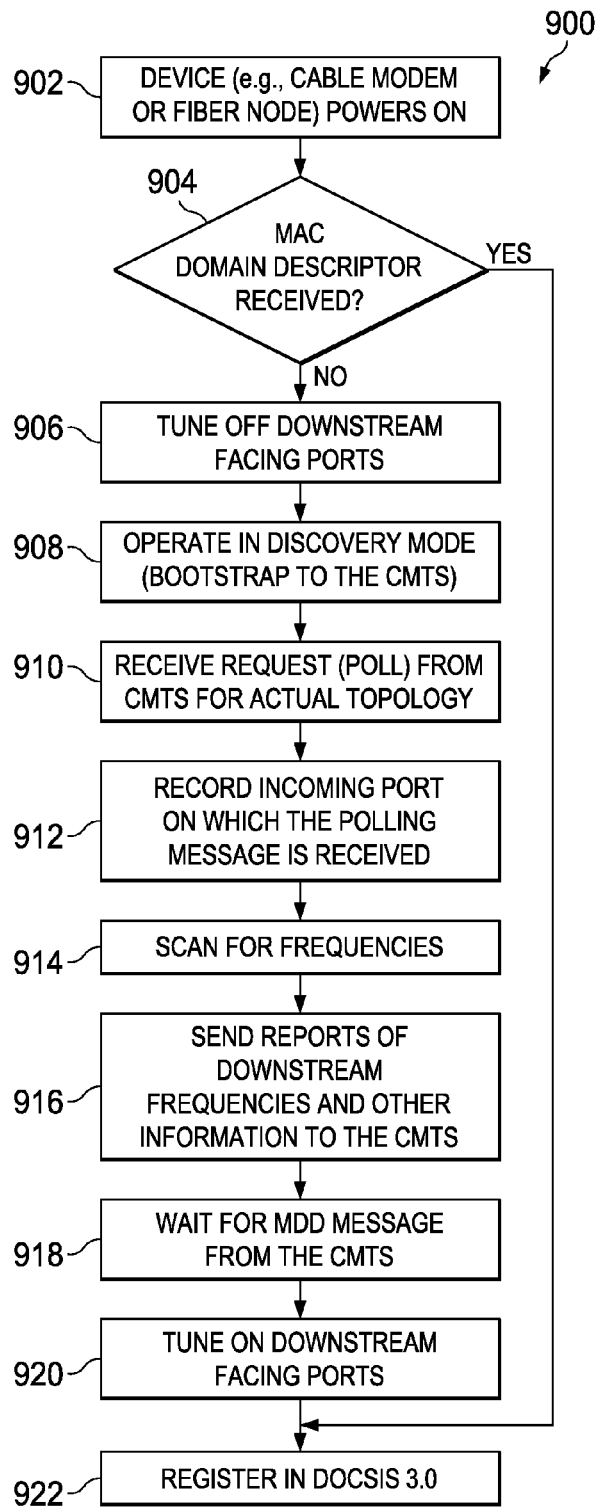
FIG. 9 is a simplified flow chart of example operational steps that may be associated with embodiments of the system.

Turning to FIGS. 8 and 9, example flow charts are illustrated depicting cable modem verification flow 800 and cable modem discovery flow, respectively. Cable modem verification flow 800 illustrates possible operations associated with embedded cable modems 43 in a fiber node implementation of system 20, or subscriber cable modems 50 in a subscriber cable modem implementation of system 20. Cable modem verification flow 800 may be configured to cause the cable modem to communicate with CMTS 30 to enable verification of the HFC topology by CMTS 30.

At 802, a cable modem (e.g., embedded cable modem 43 or subscriber cable modem 50) registers with CMTS 30 in accordance with DOCSIS 3.0 (or other appropriate interface standards), which requires knowledge of the HFC topology. At 804, cable modem 43 or 50 receives a request, which may be in the form of a polling message, from CMTS 30, for actual HFC topology information. At 806, cable modem 43 or 50 may record an incoming port on which the polling message was received. At 808, cable modem 43 or 50 scans for frequencies in response to the polling message. The scan can be a full sweep of the whole frequency range to determine which frequencies can be detected by the cable modem. For each frequency detected by cable modem 43 or 50, a unique identifier representing the particular frequency and its downstream port at CMTS 30 can be stored for subsequent reporting to CMTS 30.

Cable modem 43 or 50 can construct a response message that contains reports of the downstream frequencies detected by the cable modem and other information associated with the detected downstream frequencies. The information can include, for example, unique identifiers associated with each detected downstream frequency and its corresponding downstream port. In addition, a cookie value, if present in the polling message, may be included in the response message. Finally, the response message may also be stamped with upstream port information of the fiber node (in a fiber node implementation or subscriber cable modem implementation) and possibly port information of the subscriber CM (in a subscriber cable modem implementation). The response message can be sent to CMTS 30 via each upstream frequency available to cable modem 43 or 50. Thus, CMTS 30 can receive the response messages on each port configured to receive upstream signals from cable modem 43 or 50. Once cable modem 43 or 50 has sent response messages, cable modem 43 or 50 may continue to operate on-line and any updates to HFC topology may be configured at the headend in CMTS 30.

In FIG. 9, cable modem discovery flow 900 illustrates possible operations associated with embedded cable modems 43 in a fiber node implementation of system 20, or subscriber cable modems 50 in a subscriber cable modem implementation of system 20. Cable modem discovery flow 900 may be configured to cause the cable modem to communicate with CMTS 30 to enable automatic discovery of the HFC topology of HFC network 4 by CMTS 30.

At 902, cable modem 43 or 50 powers on in cable network 10. At 904 a determination is made as to whether a MAC domain descriptor (MDD) message has been received from CMTS 30. If an MDD message has been received, then the HFC topology is already configured and flow passes to 922 where cable modem 43 or 50 can register with CMTS 30 in accordance with DOCSIS 3.0 (or other appropriate interface standards).

If it is determined at 904 that an MDD message has not been received, then at 906, cable modem 43 or 50 can tune OFF its downstream facing ports (e.g., subscriber facing ports 48 for embedded cable modem 43 or CPE facing ports for subscriber cable modem 50). At 908, cable modem 43 or 50 operates in discovery mode and bootstraps to CMTS 30 in order to communicate with CMTS 30 to enable automatic discovery of the HFC topology of cable network 10. Accordingly, at 908, cable modem 43 or 50 can come online using a protocol that does not require knowledge of the HFC topology (e.g., DOCSIS 1.0/1.1/2.0, etc.).

After cable modem 43 or 50 has bootstrapped to CMTS 30, cable modem 43 or 50 receives a request at 910, which may be in the form of a polling message, from CMTS 30, for actual HFC topology information. At 912 cable modem 43 or 50 can record an incoming port of the cable modem on which the polling message was received. At 914, cable modem 43 or 50 scans for frequencies in response to the polling message. The scan can be a full sweep of the whole frequency range to determine which frequencies can be detected by the cable modem. For each frequency detected by cable modem 43 or 50, a unique identifier representing the particular frequency and its downstream port 37 at CMTS 30 can be stored for subsequent reporting to CMTS 30.

Cable modem 43 or 50 can construct a response message that contains reports of the downstream frequencies detected by the cable modem and other information associated with the detected downstream frequencies. The information can include, for example, unique identifiers associated with each detected downstream frequency and its corresponding downstream port 37. In addition, a cookie value, if present in the polling message, may be included in the response message. Finally, the response message may also be stamped with upstream port information of the fiber node (in a fiber node implementation or subscriber cable modem implementation) and possibly upstream port information of the subscriber cable modem 50 (in a subscriber cable modem implementation). The response message can be sent to CMTS 30 via at least one upstream frequency available to cable modem 43 or 50. In some embodiments, when a cable modem is bootstrapped to CMTS 30 during discovery mode, a more basic configuration file may be used. Consequently, the cable modem may not register to all possible upstream ports. Thus, CMTS 30 can receive the response messages on one or possibly more ports configured to receive upstream signals from the cable modem.

After the response message is sent at 916, cable modem 43 or 50 can wait at 918 to receive an MDD message from CMTS 30. CMTS 30 determines CMTS service groups and constructs the HFC topology based on the response messages. After the HFC topology map is completed, CMTS 30 may initiate DOCSIS 3.0 registration with cable modem 43 or 50 (and other cable modems in cable network 10). At 920, cable modem 43 or 50 can tune ON its downstream facing ports and at 922, cable modem 43 or 50 can register with CMTS 30 in accordance with DOCSIS 3.0 (or other suitable interface standards requiring knowledge of the HFC topology).

In example implementations, at least some portions of the activities related to the system for discovering and verifying the HFC topology of a cable network outlined herein may be implemented in software in, for example, topology verification module 34, topology discovery and verification module 35, FN scanning module 44, and/or CM scanning module 54. In some embodiments, this software could be received or downloaded from a web server or provided on computer-readable media in order to provide this system for providing data protection workflows. In some embodiments, one or more of these features may be implemented in hardware, provided external to these elements, or consolidated in any appropriate manner to achieve the intended functionality. The system may include software (or reciprocating software) that can coordinate in order to achieve the operations, as outlined herein. In still other embodiments, these elements may include any suitable algorithms, hardware, software, components, modules, interfaces, or objects that facilitate the operations thereof.

Furthermore, the embodiments of the system for discovering and verifying HFC topology described and shown herein may also include suitable interfaces for receiving, transmitting, and/or otherwise communicating data or information in a cable network environment. Additionally, some of the processors and memory elements associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., memory elements 32, 42, and 52) can store data used for the topology discovery and verification operations described herein. This includes the memory element being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processors 31, 41, and 51) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of cable network 10 (e.g., CMTS 30, fiber nodes 40, subscriber cable modems 50) may keep information in any suitable type of memory (e.g., random access memory (RAM), read-only memory (ROM), erasable programmable ROM (EPROM), electrically erasable programmable ROM (EEPROM), etc.), software, hardware, or in any other suitable component, device, element, or object where appropriate and based on particular needs. Any of the memory items discussed herein (e.g., memory elements 32, 42, 52) should be construed as being encompassed within the broad term 'memory element.' The information being read, used, tracked, sent, transmitted, communicated, or received by in cable network 10 could be provided in any database, register, queue, table, cache, control list, or other storage structure, all of which can be referenced at any suitable timeframe. Any such storage options may be included within the broad term 'memory element' as used herein. Similarly, any of the potential processing elements, modules, and machines described in this Specification should be construed as being encompassed within the broad term 'processor.'

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements (e.g., as in FIG. 2). It should be appreciated that system 20 of the FIGURES and its teachings are readily scalable and can accommodate a large number of components, as well as more complicated/sophisticated arrangements and configurations. Accordingly, the examples provided should not limit the scope or inhibit the broad teachings of system 20 as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain standards and protocols (e.g. DOCSIS 3.0), system 20 may be applicable to other exchanges, standards, or routing protocols in which packets are exchanged in order to provide topology discovery and verification. Moreover, although system 20 has been illustrated with reference to particular elements and operations that facilitate the communication process, these elements and operations may be replaced by any suitable architecture or process that achieves the intended functionality of system 20. Additionally, note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", etc. are intended to mean that any such features are included in one or more embodiments of the present disclosures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method for verifying a hybrid fiber-coaxial ("HFC") topology map of a Cable Modem Termination System ("CMTS") comprising a plurality of cable modems, the method comprising:

evaluating the HFC topology map to identify frequencies associated with a selected one of the cable modems, wherein the HFC topology map is stored in a storage device of the CMTS;

communicating a dynamic channel change request to the cable modem for each of the associated frequencies;

receiving a response message from the cable modem for each of the channel change requests; and when any one of the response messages indicates a failed attempt by the cable modem to change to a requested channel, taking an action comprising one of sending an alert to an administrator, logging a possible topology error, and taking the cable modem off-line.

2. The method of claim 1, wherein the frequencies include at least one downstream frequency and at least one upstream frequency.

3. The method of claim 1, wherein the communicating comprises sending a DOCSIS 3.0 command to the identified cable modem for each of the associated frequencies.

4. The method of claim 1, further comprising obtaining a topology map from a cable modem termination system ("CMTS").

5. The method of claim 4 further comprising determining a portion of the topology to verify.

6. An apparatus, comprising:
a memory element configured to store data;
a processor operable to execute instructions associated with the data; and
a cable modem identifier module configured to interface with the memory element and the processor, wherein the apparatus is configured to verify a hybrid fiber-coaxial ("HFC") topology map of a Cable Modem Termination System ("CMTS") comprising a plurality of cable modems, the apparatus further configured to:

evaluate the HFC topology map to identify frequencies associated with a selected one of the cable modems, wherein the HFC topology map is stored in a storage device of the CMTS;

communicate a dynamic channel change request to the cable modem for each of the associated frequencies;

receive a response message from the cable modem for each of the channel change requests; and when any one of the response messages indicates a failed attempt by the cable modem to change to a requested channel, take an action comprising one of sending an alert to an administrator, logging a possible topology error, and taking the cable modem off- line.

7. The apparatus of claim 6, wherein the frequencies include at least one downstream frequency and at least one upstream frequency.

8. The apparatus of claim 6, wherein the communicating comprises sending a DOCSIS 3.0 command to the identified cable modem for each of the associated frequencies.

9. The apparatus of claim 6, wherein the apparatus is further configured to obtain a topology map from a cable modem termination system ("CMTS").

10. The apparatus of claim 9, wherein the apparatus is further configured to determine a portion of the topology to verify.

11. Logic encoded in non-transitory computer-readable media that includes code for execution and when executed by a processor is operable to perform operations comprising:

evaluating the HFC topology map to identify frequencies associated with a selected one of the cable modems, wherein the HFC topology map is stored in a storage device of the CMTS;

communicating a dynamic channel change request to the cable modem for each of the associated frequencies;

receiving a response message from the cable modem for each of the channel change requests; and when any one of the response messages indicates a failed attempt by the cable modem to change to a requested channel, taking an action comprising one of sending an alert to an administrator, logging a possible topology error, and taking the cable modem off-line.

12. The logic of claim 11, wherein the frequencies include at least one downstream frequency and at least one upstream frequency.

13. The logic of claim 11, wherein the communicating comprises sending a DOCSIS 3.0 command to the identified cable modem for each of the associated frequencies.

14. The logic of claim 11, wherein the operations further comprise obtaining a topology map from a cable modem termination system ("CMTS").

15. The logic of claim 14, wherein the operations further comprise determining a portion of the topology to verify.

* * * * *